(12) United States Patent
Takazaki et al.

(10) Patent No.: US 10,322,653 B2
(45) Date of Patent: Jun. 18, 2019

(54) VEHICLE SEAT FAN APPARATUS AND VEHICLE SEAT

(71) Applicant: TOYOTA BOSHOKU KABUSHIKI KAISHA, Aichi-ken (JP)

(72) Inventors: Yasuaki Takazaki, Gifu-ken (JP); Hiroyuki Hayashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/847,085

(22) Filed: Dec. 19, 2017

(65) Prior Publication Data

US 2018/0178691 A1 Jun. 28, 2018

(30) Foreign Application Priority Data

Dec. 22, 2016 (JP) .................................. 2016-249393

(51) Int. Cl.
*B60N 2/56* (2006.01)
*B60H 1/00* (2006.01)

(52) U.S. Cl.
CPC ......... *B60N 2/5642* (2013.01); *B60H 1/0055* (2013.01); *B60H 1/00285* (2013.01); *B60H 1/00521* (2013.01); *B60H 2001/006* (2013.01)

(58) Field of Classification Search
CPC ...... B60N 2/5642; B60N 2/5621; B60N 2/56; B60H 1/00285; B60H 1/0055; B60H 1/00521; B60H 2001/006
USPC ............... 297/180.14, 180.1, 180.11, 180.13
See application file for complete search history.

(56) References Cited

U.S. PATENT DOCUMENTS

| | | | | |
|---|---|---|---|---|
| 3,030,145 A * | 4/1962 | Kottemann | .......... | B60N 2/5635 297/180.11 |
| 5,927,817 A * | 7/1999 | Ekman | ..................... | B60N 2/56 297/180.14 |
| 6,048,024 A * | 4/2000 | Wallman | .................. | A47C 7/74 297/180.14 |
| 6,478,369 B1 * | 11/2002 | Aoki | .................. | B60H 1/00271 297/180.1 |
| 8,998,311 B2 * | 4/2015 | Axakov | ............... | B60N 2/5635 297/180.13 |
| 2006/0138812 A1 * | 6/2006 | Aoki | ..................... | B60N 2/5635 297/180.14 |
| 2010/0209230 A1 * | 8/2010 | Eckel | .................. | B60H 1/00285 415/119 |

(Continued)

FOREIGN PATENT DOCUMENTS

JP 2016-55783 4/2016

*Primary Examiner* — Mark R Wendell
(74) *Attorney, Agent, or Firm* — Greenblum & Bernstein, P.L.C.

(57) ABSTRACT

A vehicle seat fan apparatus includes a fan including an impeller and a fan opening, the fan being attached to a vehicle seat at a position where an opening of an air passage provided on a back surface of a seat pad faces the fan opening; and a seal member configured to be interposed between the opening of the air passage and the fan opening, and to form an airflow path that allows airflow to move between the opening of the air passage and the fan opening. A release path is provided in a connection portion where the seal member is connected to the opening of the air passage, so as to allow part of the airflow to move between an inside and an outside of the airflow path, and between an inside and an outside of the air passage.

20 Claims, 8 Drawing Sheets

(56) References Cited

U.S. PATENT DOCUMENTS

| | | | | |
|---|---|---|---|---|
| 2015/0274049 A1* | 10/2015 | Langensiepen | ...... | B60N 2/5628 |
| | | | | 297/180.12 |
| 2015/0329027 A1* | 11/2015 | Axakov | ................ | B60N 2/565 |
| | | | | 297/180.13 |
| 2016/0137110 A1* | 5/2016 | Lofy | .................... | B60N 2/5635 |
| | | | | 62/3.3 |
| 2016/0332549 A1* | 11/2016 | Marquette | ............ | B60N 2/5657 |
| 2018/0020838 A1* | 1/2018 | Ishii | ........................ | B60N 2/90 |
| | | | | 297/180.13 |

\* cited by examiner

VEHICLE SEAT FAN APPARATUS AND VEHICLE SEAT

INCORPORATION BY REFERENCE

The disclosure of Japanese Patent Application No. 2016-249393 filed on Dec. 22, 2016 including the specification, drawings and abstract is incorporated herein by reference in its entirety.

BACKGROUND

1. Technical Field

The present disclosure relates to a vehicle seat fan apparatus that causes air to flow between a front surface and a back surface of a seat pad in a vehicle seat, and relates to a vehicle seat that includes the fan apparatus.

2. Description of Related Art

Japanese Patent Application Publication No. 2016-55783 (JP 2016-55783 A) describes a configuration in which a fan is disposed on a back side of a seat pad that forms a seating surface of a vehicle seat, and an air passage formed in the seat pad is connected to the fan via a duct that has an accordion tube. In the related art described in JP 2016-55783 A, the duct, which is connected to the air passage in the seat pad, and the fan are disposed to be continuous with each other in an up-down direction.

SUMMARY

As described in JP 2016-55783 A, in the case where the duct and fan are disposed to be continuous with each other in a direction in which the duct and the fan are connected to the seat pad, the thickness of an entire fan apparatus including the duct and the fan is increased. Thus, a large space is required for installing the fan, though there is a limited space on the back side of the seat pad. In addition, smooth airflow is hindered by unevenness of an accordion structure provided in the duct and thus noise tends to be generated.

As solutions for the above problems, it is considered to adopt a configuration in which the fan is disposed such that an outlet of the fan faces an opening of the air passage in the seat pad and the outlet is directly connected to the opening of the air passage. By adopting the configuration, a vehicle seat fan apparatus that can be installed without interposing the duct between the seat pad and the fan is obtained. In addition, in the above configuration, it is considered to provide an elastic seal member in a gap between the outlet and the opening of the air passage, so as to seal an airflow path between the outlet and the opening of the air passage. Thus, it is possible to improve airtightness in a connection portion between the outlet and the opening of the air passage, and to improve cushioning properties in the connection portion with the use of the elasticity of the seal member.

However, a portion of the seal member connected to the seat pad may be covered with, for example, a hard felt material, and may have a non-smooth surface. Therefore, the seal member may not completely contact a surface of the seat pad in a connection portion between the seal member and the surface of the seat pad, and a slight gap, through which the air can flow, may be formed. When the airflow, which is generated by the fan, enters such a slight gap, aerodynamic noise, that is, so-called whistling noise may be generated.

In view of the above, the present disclosure provides a vehicle seat fan apparatus that makes it possible to reduce aerodynamic noise caused by airflow moving through a gap in a connection portion between a seal member and a seat pad, and the present disclosure also provides a vehicle seat including the fan apparatus.

A vehicle seat fan apparatus according to an aspect of the present disclosure is configured to be attached to a vehicle seat including a seat pad defining a support surface that supports a body of a seated occupant, the seat pad having an air passage configured such that air flows through the air passage, and the vehicle seat fan apparatus being configured to cause the air to flow through the air passage. The vehicle seat fan apparatus includes a fan and a seal member.

The fan includes an impeller that generates airflow, and a fan opening as an opening that allows the airflow to move through the air passage. The fan is attached to the vehicle seat so as to extend along the seat pad at a position where an opening of the air passage provided on a back surface of the seat pad faces the fan opening.

The seal member is configured to be interposed between the opening of the air passage and the fan opening, and to surround a space between the opening of the air passage and the fan opening so as to form an airflow path that allows the airflow to move between the opening of the air passage and the fan opening. A release path is provided in a connection portion where the seal member is connected to the opening of the air passage, so as to allow part of the airflow to move between an inside and an outside of the airflow path surrounded by the seal member, and between an inside and an outside of the air passage.

With the above configuration, the fan can be installed without interposing a duct between the seat pad and the fan. Thus, the thickness of the entire fan apparatus can be reduced. This is advantageous for installing the vehicle seat fan apparatus in a limited space on a back side of the seat pad.

Because the seal member is interposed between the fan opening and the opening of the air passage, airtightness in a connection portion between the fan opening and the air passage in the seat pad can be improved. The seal member also contributes to reducing a shock between the seat pad and the fan. Further, because the release path is provided in a connection portion where the seal member is connected to the back surface of the seat pad, the airflow path can be formed to have lower flow resistance than the flow resistance in a slight gap that is generated in a contact portion between the seal member and the back surface of the seat pad. Thus, while a degree of the airtightness that is required for causing the airflow to move through the air passage in the seat pad is maintained, the airflow moving through the gap between the seal member and the back surface side of the seat pad can be reduced. Therefore, aerodynamic noise caused by the airflow moving through this gap can be suppressed.

In the vehicle seat fan apparatus according to the above aspect of the present disclosure, the release path may be configured such that, when the fan is operated, a flow rate of the air flowing through the release path is lower than a flow rate of the air flowing through the air passage. With the configuration, it is possible to suppress degradation of an air-conditioning function of the vehicle seat that is caused when the airflow generated by the fan moves through the release path at an excessive flow rate.

In the vehicle seat fan apparatus according to the above aspect of the present disclosure, the following configuration may be adopted. For example, a clearance may be provided as the release path in a portion of the seal member, the clearance allowing the air to flow between the inside and the outside of the airflow path. With the configuration, the aerodynamic noise that is generated in the gap between the seal member and the seat pad can be reduced by processing the seal member such that the seal member has the clearance.

In the vehicle seat fan apparatus according to the above aspect of the present disclosure, in the seal member, the release path may be provided at a position where a load that is applied from the seated occupant is relatively small. With the configuration, it is possible to prevent a situation where the release path is closed when the seal member is compressed by the load applied from the seated occupant.

In the vehicle seat fan apparatus according to the above aspect of the present disclosure, the seal member may be configured as a ring-shaped member in which a portion is opened, and may be configured such that the opened portion serves as the release path. The configuration can be applied to, for example, a case where the seal member is formed to have a closed ring shape, and then, a part of the seal member is cut out to provide the release path.

Alternatively, in the vehicle seat fan apparatus according to the above aspect of the present disclosure, the seal member may be configured as a closed ring-shaped member, and a hole extending between an inside and an outside of a ring shape of the seal member may be provided as the release path. The configuration can be applied to, for example, a case in which the seal member is formed to have a shape that is originally provided with a through hole as the release path.

In the vehicle seat fan apparatus according to the above aspect of the present disclosure, the seal member may be made of a softer material than a material constituting the seat pad. With the configuration, it is possible to effectively absorb the load that presses the seat pad against the fan at a time when the occupant is seated on the vehicle seat. Therefore, the occupant can be less likely to have a feeling of a foreign body, that is, a feeling of the fan through the seat pad.

Another aspect of the present disclosure relates to a vehicle seat. The vehicle seat includes a seat pad defining a support surface that supports a body of a seated occupant and having an air passage configured such that air flows through the air passage; and a fan apparatus configured to cause the air to flow through the air passage. The fan apparatus included in the vehicle seat corresponds to the vehicle seat fan apparatus according to the above aspect of the present disclosure. Thus, it is possible to obtain the vehicle seat including the fan apparatus that makes it possible to reduce aerodynamic noise caused by airflow moving through the gap between the seal member and the seat pad.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described on the basis of the drawings. Note that the present disclosure is not limited to the embodiments described below, and can be implemented in various modes. In the embodiments, a vehicle seat fan apparatus and a vehicle seat including the fan apparatus in the present disclosure are applied to a seat that is used as a seat for an automobile (a vehicle) or the like. Note that, in the embodiments, arrows indicating upward, downward, frontward, rearward, rightward, and leftward directions are provided in each of the drawings to facilitate understanding of relationships between the drawings. The present disclosure is not limited to the directions indicated in each of the drawings.

Figure 1:
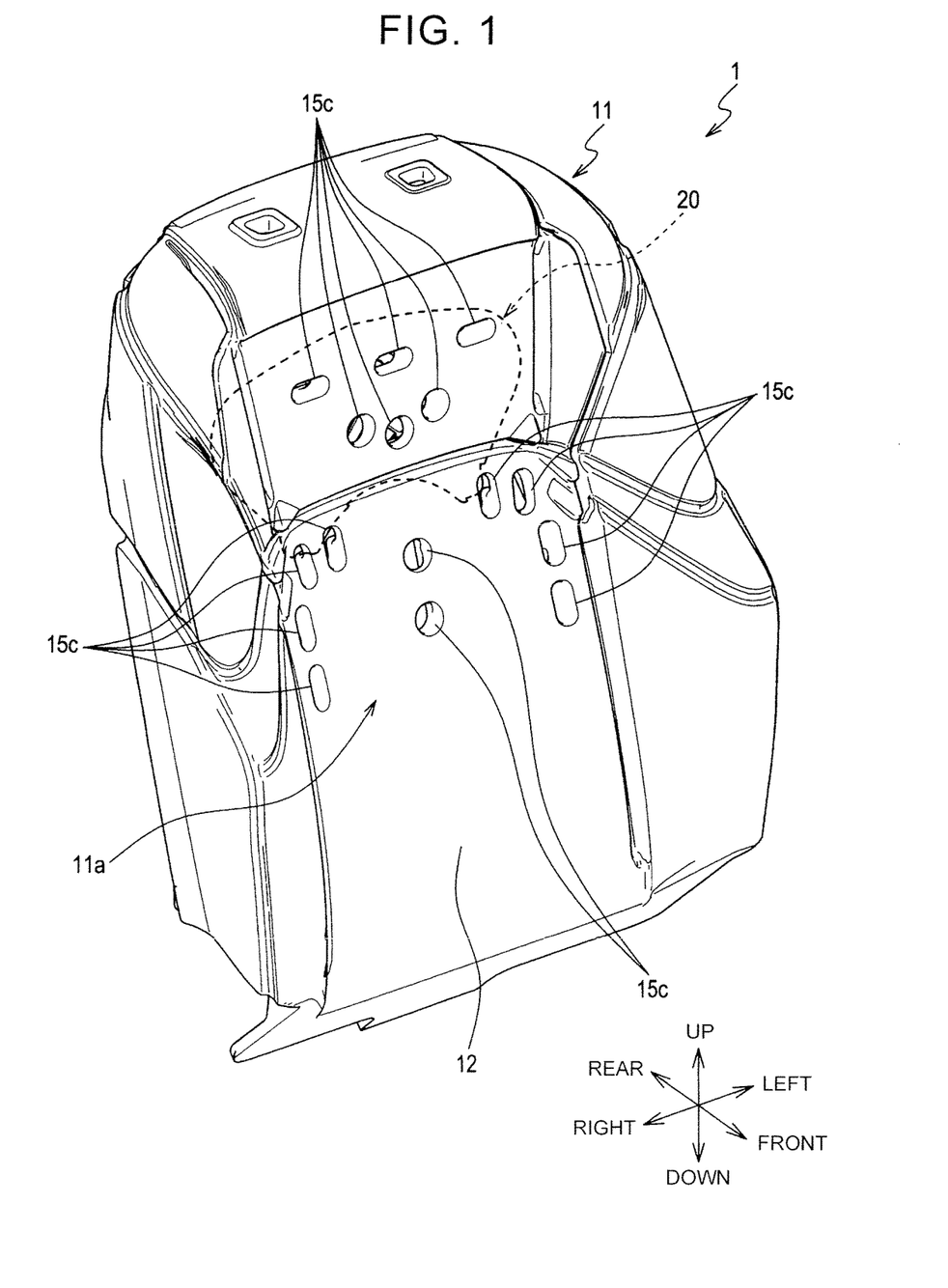
FIG. 1 is a perspective view of a seat back that is seen from a front side.
Figure 2:
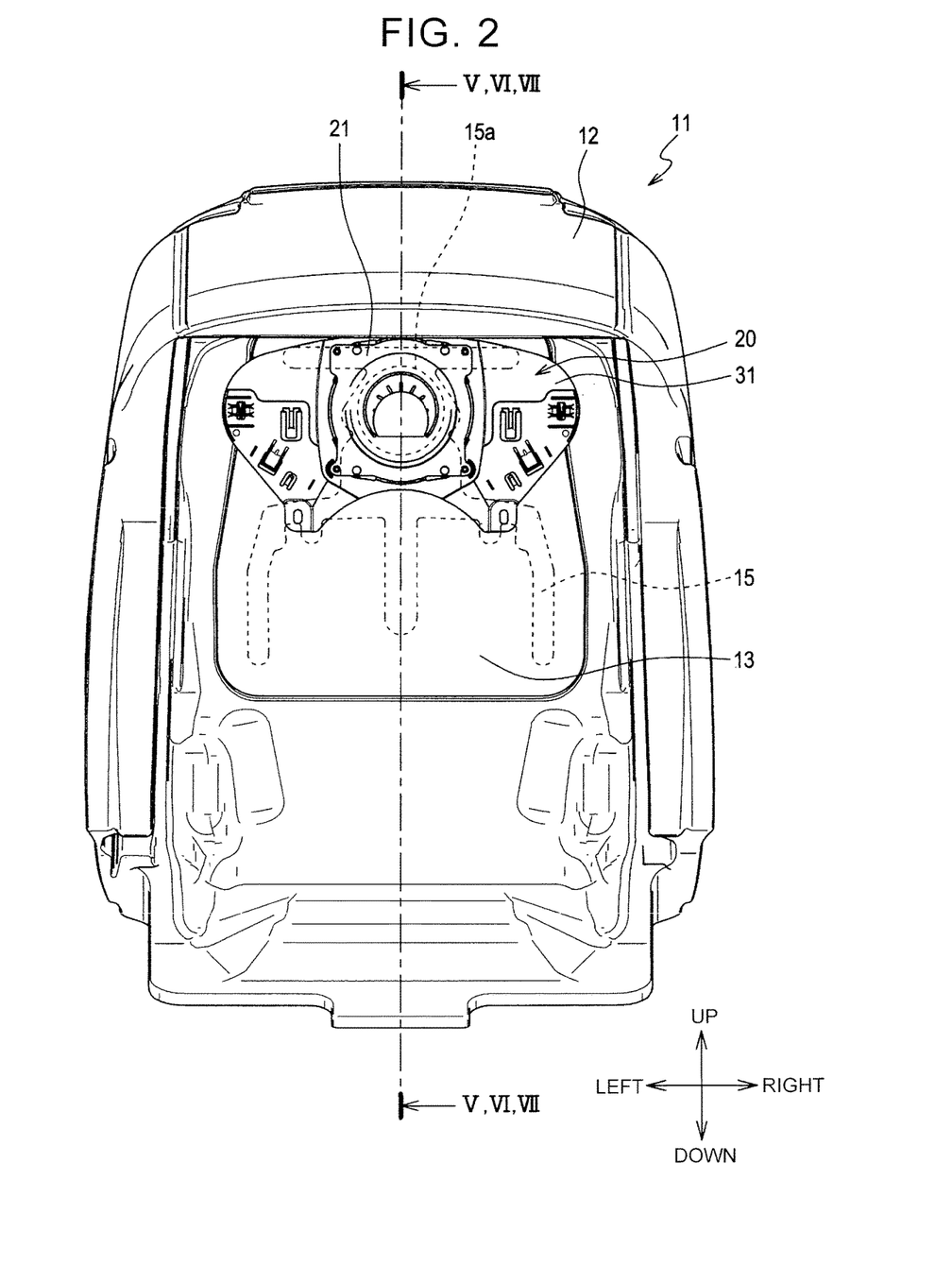
FIG. 2 is a rear view of the inside of the seat back and illustrates a state where a fan unit is disposed.

As exemplified in FIG. 1 and FIG. 2, a seat 1 includes a seat back 11 that supports a back of a seated occupant; a seat cushion (not shown) that supports buttocks of the seated occupant; a fan unit 20 that is disposed in the seat back 11; and a headrest (not shown). This seat 1 includes an air-conditioning mechanism configured to suction air from a plurality of front-surface openings 15c provided on a backrest surface 11a formed in the seat back 11. A description will be provided on an embodiment of the present disclosure by using the seat back 11 as an example.

The seat back 11 includes a seat pad 12 that is made of urethane foam functioning as a cushion material. The seat pad 12 covers a back frame (not shown) constituting a framework of the seat back 11, so as to form the backrest surface 11a. Hereinafter, a surface of the seat pad 12 that faces toward a front side and a surface of the seat pad 12 that faces toward a rear side are referred to as a front surface and a back surface, respectively.

As exemplified in FIG. 2, the fan unit 20 is provided in an upper portion on the back surface of the seat pad 12. This fan unit 20 may be regarded as the vehicle seat fan apparatus. The fan unit 20 includes a fan 21 that generates airflow with the use of a rotating impeller. In this fan unit 20, a fan port 24 is provided as an opening from which the fan 21 suctions the air. The fan unit 20 is attached such that the fan port 24 faces the back surface of the seat pad 12.

An air passage 15 is formed on the back surface of the seat pad 12, and the air passage 15 is formed of a plurality of grooves extending from a position where the grooves face the fan port 24 and spreading along the backrest surface 11a. At a plurality of positions, portions of this air passage 15 extend through the seat pad 12 to the front surface of the seat pad 12. Thus, the air can flow through the seat pad 12 between the front surface and the back surface.

A seat pad back lid 13 is attached to an area where the air passage 15 is formed in the back surface of the seat pad 12, so as to cover an opened surface of the air passage 15. The seat pad back lid 13 is a thin plate-shaped member made of hard felt, for example. Because the seat pad back lid 13 closes the opened surface of the air passage 15, the air can flow along the grooves of the air passage 15. Furthermore, the seat pad back lid 13 is provided with an air passage opening 15a at a position that directly faces the fan port 24, and the air passage opening 15a is an opening through which the air flows. Through this opening, the fan port 24 and the air passage 15 communicate with each other. Accordingly, when the fan unit 20 suctions the air from the fan port 24, the air that is suctioned from the front surface of the seat pad 12 can be discharged to the back side of the seat pad 12 through the air passage 15.

Figure 3:
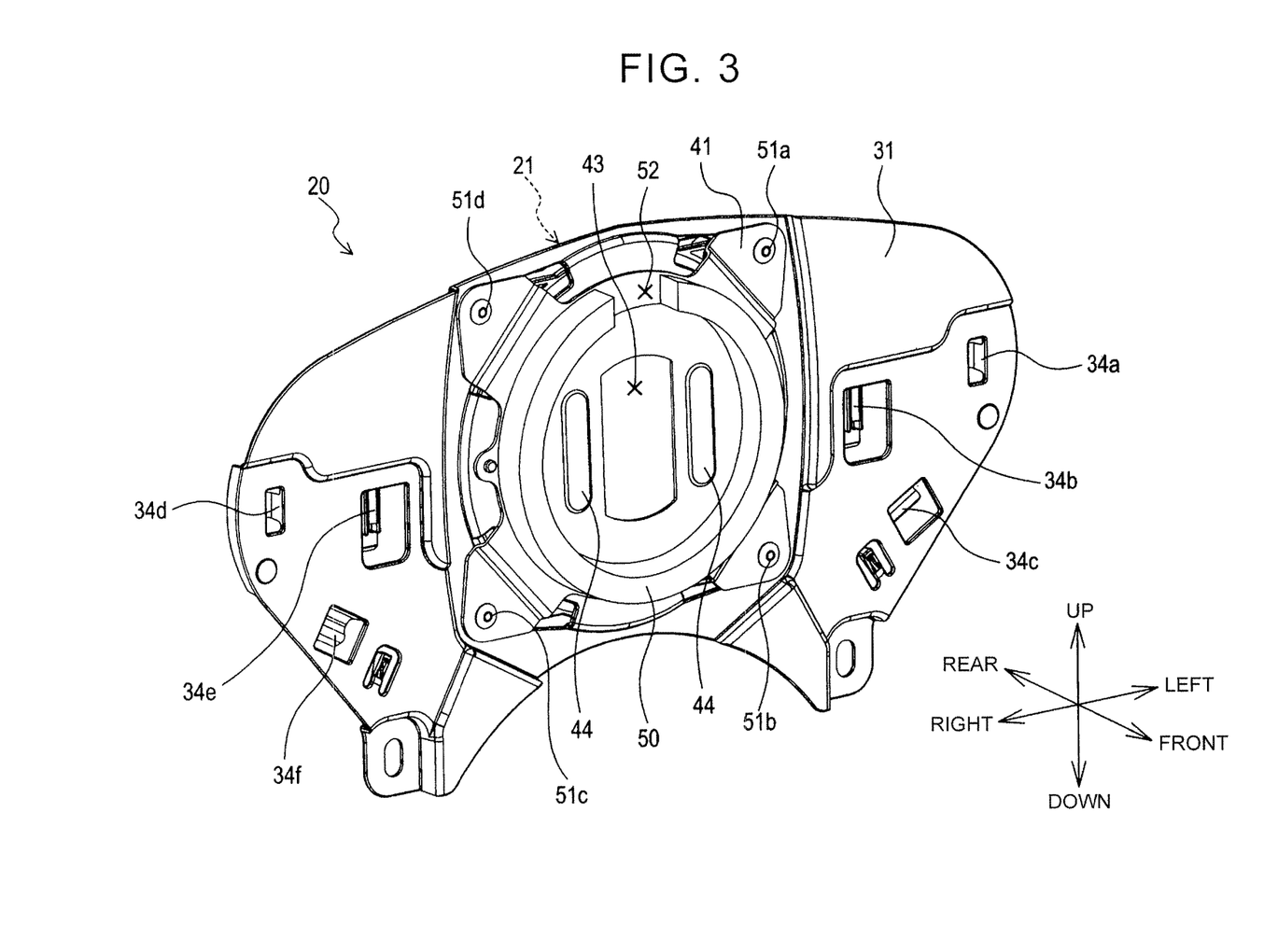
FIG. 3 is a perspective view of the fan unit that is seen from the front side.
Figure 4:
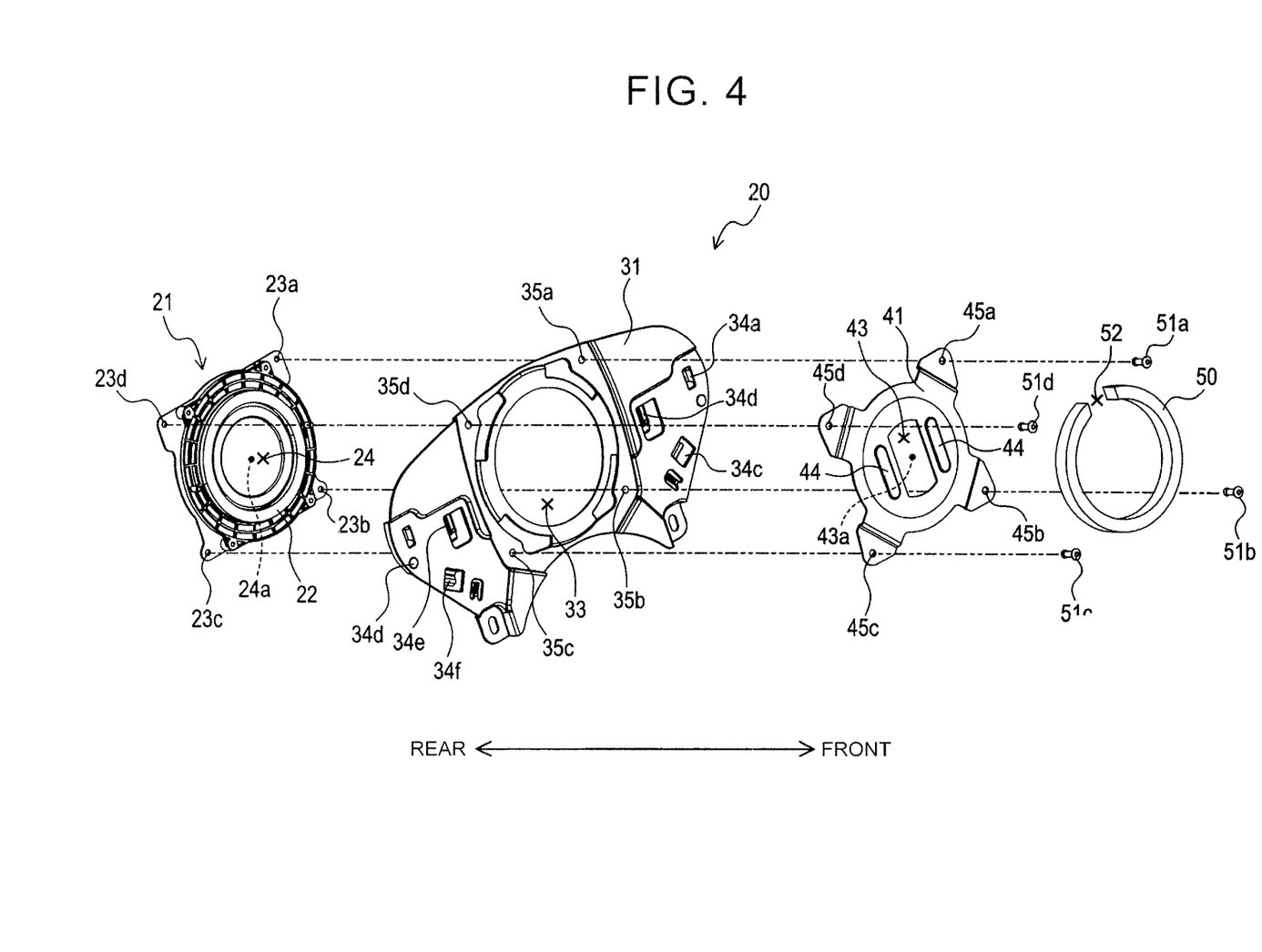
FIG. 4 is an exploded view of members constituting the fan unit.

Next, a description will be provided on a detailed configuration of the fan unit 20 with reference to FIG. 3 and FIG. 4. As exemplified in FIG. 3 and FIG. 4, the fan unit 20 is configured by sequentially stacking (superposing) the fan 21, an attachment member 31, a cover plate 41, and a seal member 50 in line.

The fan 21 is a fan that generates the airflow by rotating the impeller using a motor, and is provided in the rearmost side of the fan unit 20. In this embodiment, a centrifugal fan is used as the fan 21. However, a fan of another type may be used. As exemplified in FIG. 4, the fan 21 includes a fan casing 22, and the fan casing is an outer case that accommodates the motor and the impeller (not shown). The impeller is accommodated in the fan casing 22 in such an orientation that a rotational shaft extends in a front-rear direction and the impeller suctions the air from the front side of the fan 21.

The fan port 24 is provided in a central portion in the front side of the fan casing 22, and the fan port 24 is a circular opening that is centered on a rotational axis of the impeller. This fan port 24 may be regarded as the fan opening. The air is suctioned from the fan port 24 and discharged from a discharge port (not shown) that is provided in a rear side of the fan casing 22. In addition, four fastening holes 23a, 23b, 23c, 23d are provided around the fan port 24. The fastening holes 23a to 23d are holes through which rivets 51a, 51b, 51c, 51d are inserted, and the rivets 51a to 51d are used to fasten the fan 21, the attachment member 31, and the cover plate 41 that are sequentially superposed. These fastening holes 23a to 23d are disposed at equal intervals in a circumferential direction about the fan port 24.

The attachment member 31 is a plate-shaped member that is held between a front side of the fan 21 and a rear side of the cover plate 41 and extends in a right-left direction along an in-plane direction of the fan port 24. This attachment member 31 has a function of positioning and supporting the fan unit 20 at a position where the fan port 24 directly faces an opening portion of the air passage 15 provided on the back surface of the seat pad 12. The attachment member 31 is made of elastic hard resin, for example, and is configured to support the fan unit 20 such that the fan unit 20 is pressed in a direction toward the back surface of the seat pad 12 by an elastic force of the attachment member 31.

As exemplified in FIG. 4, a communication hole 33 is provided in a central portion of the attachment member 31, and the communication hole 33 is a circular opening through which the fan port 24 is exposed to the front side and through which the air can flow. Four fastening holes 35a, 35b, 35c, 35d are provided around this communication hole 33, and the fastening holes 35a to 35d are the holes through which the rivets 51a to 51d are inserted. These fastening holes 35a to 35d are disposed at positions that correspond to the fastening holes 23a to 23d of the fan 21, respectively.

In a right side and a left side of the attachment member 31, a plurality of engagement claws 34a, 34b, 34c, 34d, 34e, 34f is provided to protrude toward a back surface-side of the attachment member 31 (that is, to protrude rearward). Each of the engagement claws 34a to 34f is disposed at a position that corresponds to a member related to the back frame, the member related to the back frame being provided at a position where the fan unit 20 should be attached. Thus, each of the engagement claws 34a to 34f is engaged with the member related to the back frame. Thus, the fan unit 20 is positioned, and is supported at a specified position.

The cover plate 41 is a plate-shaped member that is provided in front of the attachment member 31 and covers the fan port 24 from the front side. The cover plate 41 is a member through which the airflow moves. Further, the cover plate 41 has a function of protecting the fan port 24. Protection mentioned herein includes, for example, reducing a load that is applied from the front surface of the seat pad 12 to the fan port 24, and suppressing entry of a foreign substance (for example, a part of the seat pad 12) into the fan port 24. For this reason, the cover plate 41 is made of a rigid material such as metal.

As exemplified in FIG. 3 and FIG. 4, a cover vent 43 is provided in a central portion of the cover plate 41, and the cover vent 43 is an opening through which the airflow moves. The cover vent 43 has an opened region that is opened in accordance with a circular region corresponding to the shape of the fan port 24. In addition, in the central portion of the cover plate 41, protection portions 44 are respectively provided at positions on both sides of the cover vent 43, and the protection portions 44 have shapes of long and thin protrusions. Thickness of each of the protection portions 44 secures separation between the seat pad 12 and the fan port 24. Thus, the load that is applied to the fan port 24 is reduced, and the entry of the foreign substance into the fan port 24 is suppressed.

As exemplified in FIG. 4, four fastening holes 45a, 45b, 45c, 45d are provided around the cover vent 43 and the protection portions 44, and the fastening holes 45a to 45d are holes through which the rivets 51a to 51d are inserted. The fastening holes 45a to 45d are disposed at positions that correspond to the fastening holes 23a to 23d of the fan 21, respectively.

The fan 21, the attachment member 31, and the cover plate 41 are integrally fastened by the rivets 51a to 51d. More specifically, the fan 21, the attachment member 31, and the cover plate 41 are sequentially superposed (stacked) in the stated order at a position where the fastening holes 23a to 23d, the fastening holes 35a to 35d, and the fastening holes 45a to 45d overlap with each other. Then, the rivets 51a to 51d are inserted through the fastening holes, and the shaft ends of the rivets 51a to 51d are riveted. Thus, the fan 21, the attachment member 31, and the cover plate 41 are fastened. After the fan 21, the attachment member 31, and the cover plate 41 are fastened, a center 24a of the fan port 24 and a center 43a of the cover vent 43 are positioned so as to overlap with each other in the front-rear direction. That is, the rotational axis of the impeller installed in the fan 21, the center 24a of the fan port 24, and the center 43a of the cover vent 43 are aligned in a straight line.

The seal member 50 is a seal member used to provide airtightness between the fan port 24 and the air passage opening 15a, and is disposed in the foremost side of the fan unit 20. The seal member 50 is made of an elastic material with airtightness, and examples of the elastic material with airtightness include synthetic resin foam such as soft urethane foam; and foamed rubber. In addition, a softer material than the material constituting the seat pad 12 is used for the seal member 50. The seal member 50 is a ring-shaped member that has an inside diameter larger than or equal to a diameter of each of the fan port 24 and the air passage opening 15a. As exemplified in FIG. 3, the seal member 50 is disposed to surround the cover vent 43 in front of the fan port 24 and to be in close contact with the cover plate 41.

In addition, the seal member 50 is configured as a C-shaped ring member in which a top portion is opened, and the seal member 50 is provided with a release path 52. The release path 52 is a clearance that allows the air to flow between the inside and the outside of the ring shape. With the configuration, part of the airflow that is generated by operation of the fan 21 moves between the inside of the seal member 50 and the outside thereof via the release path 52. A flow rate in the release path 52 can be adjusted in accordance with the size and the shape of the release path 52 (i.e., the flow rate in the release path 52 can be adjusted by adjusting the size and the shape of the release path 52). In this embodiment, the size and the shape of the release path 52 are set such that, in a total flow rate of the airflow generated by the fan 21, the flow rate of the air flowing through the release path 52 is lower than a flow rate of the air flowing through the air passage 15 in the seat pad 12. In other words, the release path 52 is provided a connection portion where the seal member 50 is connected to the air passage opening 15a. Examples of the connection portion where the seal member 50 is connected to the air passage opening 15a include i) a portion of the seal member 50, which is connected to the seat pad back lid 13, ii) a portion of the seat pad 12, which is located in the vicinity of the connection portion between the seat pad back lid 13 and the seal member 50, and iii) a portion of the seat pad back lid 13, which is located in the vicinity of the connection portion between the seat pad back lid 13 and the seal member 50. However, the connection portion where the seal member 50 is connected to the air passage opening 15a is not limited to the portions described in i), ii), and iii).

The release path 52 is provided in a portion of the seal member 50 where the load from the seated occupant is relatively small. For example, it is considered that the load applied from the seated occupant to the seat back 11 is large in a lower portion of the seat back 11 near the buttocks of the seated occupant, and is small in an upper portion thereof that is far from the buttocks of the seated occupant. Accordingly, in this embodiment in which the fan unit 20 is disposed on the back side of the seat pad 12, the release path 52 is provided in the top portion of the seal member 50 where the load from the seated occupant is smallest. Thus, it is possible to avoid a situation where the release path 52 is squashed by the load from the seated occupant and the release path 52 stops functioning.

Figure 5:
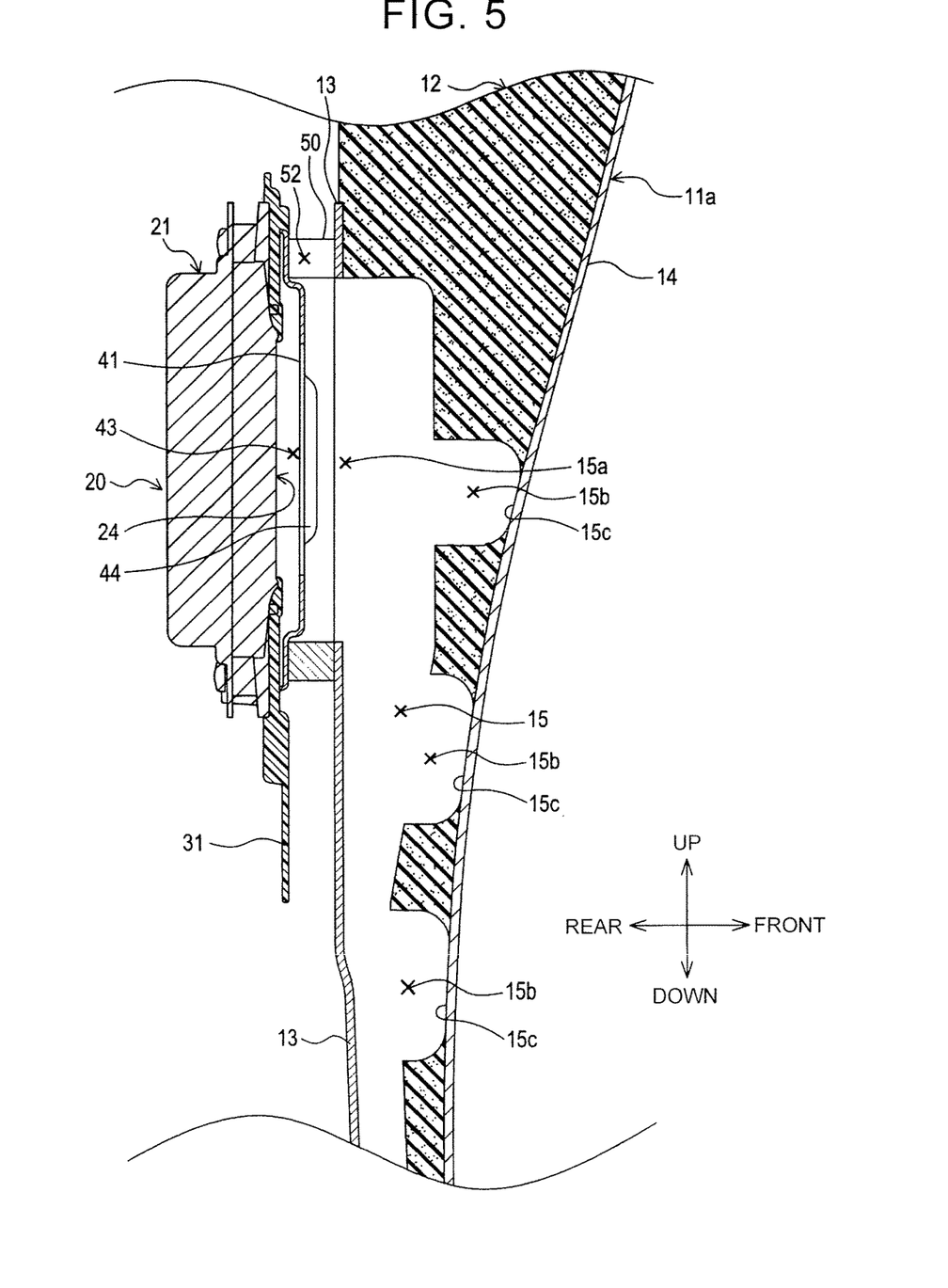
FIG. 5 is a partial sectional view of a structure of a connection portion between the seat back and the fan unit.

Next, a description will be provided on a structure in which the fan unit 20 is connected so as to allow the airflow to move through the air passage 15 in the seat pad 12, with reference to FIG. 5. As exemplified in FIG. 5, the groove-shaped air passage 15 that extends in an up-down direction is provided on the back surface of the seat pad 12. The opened surface of the air passage 15, which is provided on the back surface of the seat pad 12, is covered with the seat pad back lid 13. Thus, an airflow path along the air passage 15 is formed. In addition, the seat pad back lid 13 is provided with the air passage opening 15a as the circular opening through which the air flows.

A plurality of penetration paths 15b is provided in the seat pad 12, and each of the penetration paths 15b is branched from a part of the air passage 15 and reaches the front surface of the seat pad 12. The front-surface openings 15c are provided on the front surface of the seat pad 12, and the front-surface openings 15c are the openings that communicate with the penetration paths 15b. A seat cover 14 serves as a cover of the backrest surface 11a, and the seat cover 14 covers the front surface of the seat pad 12 so as to closely contact the seat pad 12. In the seat cover 14, an air permeable structure is provided at least at each of positions corresponding to the front-surface openings 15c. The air permeable structure such as a mesh material or a through hole allows the air to flow between a front surface and a back surface of the seat cover 14.

By using the attachment member 31, the fan unit 20 is disposed and attached to a position where the fan port 24 and the cover vent 43 directly face the air passage opening 15a of the seat pad back lid 13. In detail, the fan unit 20 is disposed at a position where the rotational axis of the impeller in the fan 21, the center of the fan port 24, the center of the cover vent 43, and a center of the air passage opening 15a are aligned in a straight line in the front-rear direction.

The fan unit 20 is supported so as to be pressed in a direction toward the seat pad back lid 13 in front of the fan unit 20 by the elastic force of the attachment member 31. Accordingly, the seal member 50, which is interposed between the cover plate 41 and the seat pad back lid 13, is compressed by the cover plate 41 and the seat pad back lid 13. Thus, the seal member 50 surrounds the cover vent 43 and the air passage opening 15a, and closely contacts the cover plate 41 and the seat pad back lid 13. Thus, an airflow path between the fan port 24 and the air passage 15 is sealed. In addition, the release path 52 is provided in the top portion of the seal member 50, and the release path 52 provides communication between the inside and the outside of the airflow path between the fan port 24 and the air passage 15.

When the fan 21 is operated in the above-described structure, the airflow from the front surface of the seat pad 12 to the back surface thereof is generated. Thus, the air that is suctioned from the front-surface openings 15c through the seat cover 14 flows through the penetration paths 15b and the air passage 15, is suctioned from the fan port 24 of the fan unit 20, and is discharged to the rear side.

Due to the operation of the fan 21, the outside air flows into the seal member 50 through the release path 52 provided in the top portion of the seal member 50. That is, the air that is suctioned from the fan port 24 of the fan unit 20 includes the air that flows into the seal member 50 through the air passage 15, and further includes the air that flows into the seal member 50 through the release path 52.

Because the release path 52 is provided in a connection portion between the seal member 50 and the seat pad back lid 13, the airflow path is formed to have lower flow resistance than the flow resistance in a gap formed in a contact portion between the seal member 50 and the seat pad back lid 13. Thus, the airflow moving through the gap in the contact portion between the seal member 50 and the seat pad back lid 13, which is a cause of aerodynamic noise, is reduced.

Next, a description will be provided on operational effects of the fan unit 20 and operational effects of the seat 1 that includes the fan unit 20 in the above embodiment. With the use of the fan unit 20, it is possible to provide the vehicle seat fan apparatus that can be installed without interposing a duct between the seat pad 12 and the fan 21. Because the duct that is interposed between the seat pad 12 and the fan 21 is not provided, the thickness of the entire fan unit 20 can be reduced. The reduction in the thickness of the fan unit 20 is advantageous when the fan unit 20 is installed in a limited space on the back side of the seat pad 12. In addition, it is possible to avoid a situation where noise is caused by airflow in the duct.

Because the seal member 50 is provided to seal the airflow path between the fan port 24 and the air passage opening 15a, airtightness in a connection portion between the cover vent 43 and the air passage 15 can be improved. The seal member 50 also contributes to reducing a shock and noise between the seat pad 12 and the cover plate 41.

Because the release path 52 is provided in the portion of the seal member 50, the airflow moving through the gap in the contact portion between the seal member 50 and the seat pad back lid 13 can be reduced. Thus, the aerodynamic noise caused by the airflow moving through this gap can be suppressed. In addition, the configuration is made such that the flow rate of the air flowing through the release path 52 is lower than the flow rate of the air flowing through the air passage 15 during the operation of the fan 21. Thus, degradation of an air-conditioning function of the seat back 11 can be suppressed.

Because the release path 52 is provided in the top portion of the seal member 50 where the load from the seated occupant is relatively small, it is possible to prevent a situation where the release path 52 is closed when the seal member 50 is compressed by the load. In addition, because the seal member 50 is made of the softer material than the material constituting the seat pad 12, the seated occupant is less likely to have a feeling of a foreign body, that is, a feeling of the fan unit 20 through the seat pad 12.

Hereinafter, modified embodiments will be described. (1) In the above-described embodiment, the description has been provided on the air-conditioning mechanism in which the fan 21 generates the airflow from the front surface of the seat pad 12 to the back surface thereof so as to suction the air from the backrest surface 11a. However, the present disclosure is not limited to this configuration. The air-conditioning mechanism may be configured such that the fan 21 generates the airflow from the back surface of the seat pad 12 to the front surface thereof so as to blow the air from the backrest surface 11a.

(2) In the above-described embodiment, the description has been provided on the air-conditioning mechanism that includes the fan unit 20 disposed in the seat back 11 that supports the back of the seated occupant, and causes the air to flow between the front surface of the seat back 11 and the back surface thereof. However, the present disclosure is not limited to this configuration. The air-conditioning mechanism may be configured to include the fan unit 20 disposed in the seat cushion that supports the buttocks of the seated occupant, and to cause the air to flow between opposite surfaces of the seat cushion. In this case, in order to provide a release path at a position where the load from the seated occupant is relatively small, it is considered to provide a clearance in a front portion of the seal member 50 that is away from the buttocks of the seated occupant.

(3) In the above-described embodiment, the description has been provided on the case where the clearance provided in the portion of the seal member 50 is employed as the release path in the present disclosure. However, the present disclosure is not limited to this configuration. The release path may be provided in a member other than the seal member 50.

Figure 6:
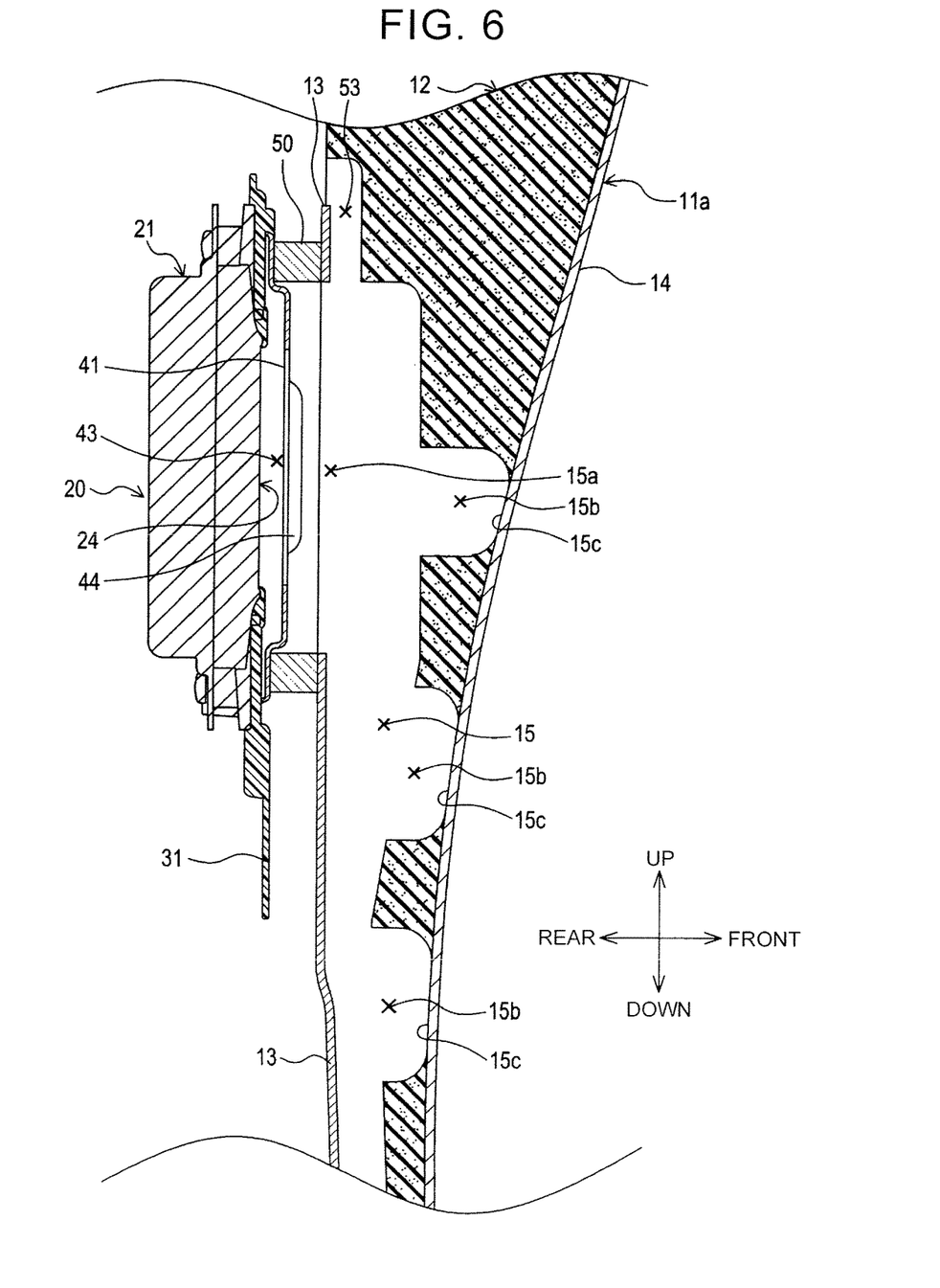
FIG. 6 is a partial sectional view of a seat back in a modified embodiment in which a release path is provided in a seat pad.

For example, as exemplified in FIG. 6, the seat pad 12 may be configured to include a release path 53. In a case shown in FIG. 6, the seal member 50 is configured to have a closed ring shape that does not include the clearance corresponding to the release path. Instead of the clearance in the seal member 50, the release path 53 in a long and thin groove shape is provided in the seat pad 12 at a position in a connection portion between the seal member 50 and the air passage opening 15a (more specifically, the release path 53 is provided in a portion of the seat pad 12, which is located in the vicinity of the connection portion between the seal member 50 and the seat pad back lid 13), and the release path 53 provides communication between the inside of the air passage 15 and a space outward of the seal member 50.

In the above-described structure, when the fan 21 is operated, part of the airflow moves between the inside and the outside of the air passage 15 through the release path 53. Note that the size and the shape of the release path 53 are set such that, in the total flow rate of the airflow generated by the fan 21, the flow rate of the air flowing through the release path 53 is lower than the flow rate of the air flowing through the air passage 15 in the seat pad 12. Because the release path 53 is provided in the connection portion between the seal member 50 and the air passage opening 15a, an airflow path is formed to have lower flow resistance than the flow resistance in the gap between the seal member 50 and the seat pad back lid 13. Thus, the airflow moving through the gap between the seal member 50 and the seat pad back lid 13 can be reduced.

Figure 7:
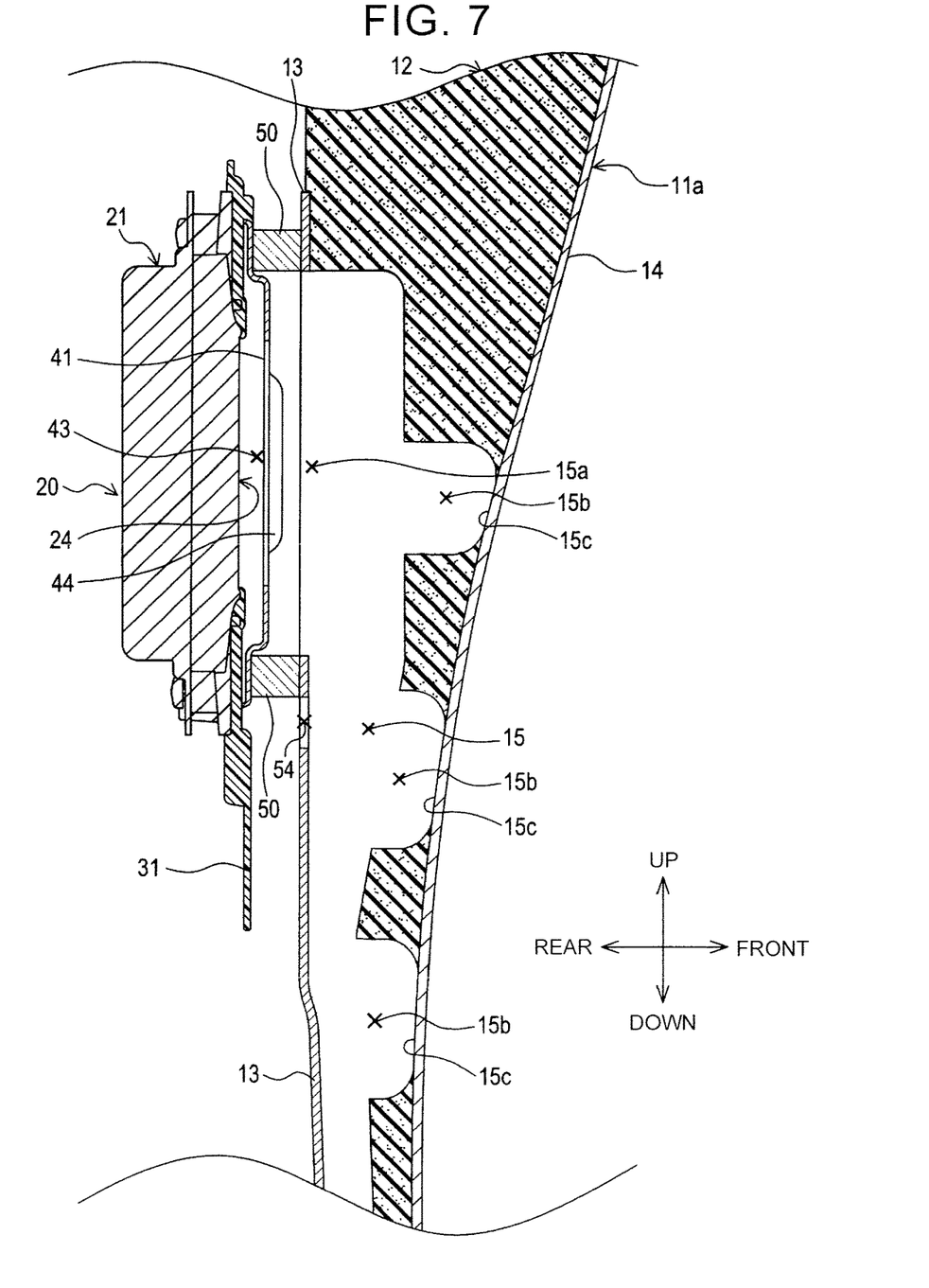
FIG. 7 is a partial sectional view of a seat back in another modified embodiment in which a release path is provided in a seat pad back lid.

Alternatively, as exemplified in FIG. 7, the seat pad back lid 13 may be configured to include a release path 54. In a case shown in FIG. 7, the seal member 50 is configured to have the closed ring shape that does not include the clearance corresponding to the release path. Instead of the clearance in the seal member 50, the release path 54 is provided in the connection portion between the seal member 50 and the air passage opening 15a (more specifically, the release path 54 is provided in a portion of the seat pad back lid 13, which is located in the vicinity of the connection portion between the seal member 50 and the seat pad back lid 13), and the release path 54 is a hole that extends from the front surface to the back surface of the seat pad back lid 13.

In the above-described structure, when the fan 21 is operated, part of the airflow moves between the inside and the outside of the air passage 15 through the release path 54. The size and the shape of the release path 54 are set such that, in the total flow rate of the airflow generated by the fan 21, the flow rate of the air flowing through the release path 54 is lower than the flow rate of the air flowing through the air passage 15 in the seat pad 12. Because the release path 54 is provided in the connection portion between the seal member 50 and the air passage opening 15a, an airflow path is formed to have lower flow resistance than the flow resistance in the gap between the seal member 50 and the seat pad back lid 13. Thus, the airflow moving through the gap between the seal member 50 and the seat pad back lid 13 can be reduced.

Figure 8:
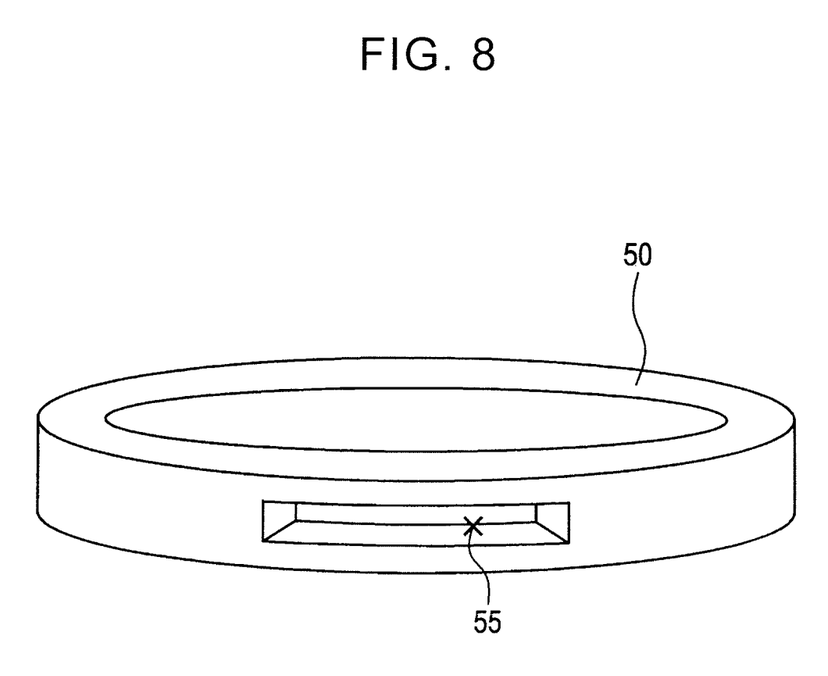
FIG. 8 is a perspective view of a seal member in a yet another modified embodiment.

(4) In the above-described embodiment, the description has been provided on the case where the seal member 50 is configured as the C-shaped ring member in which a portion is opened, and the opened portion serves as the release path 52. However, the present disclosure is not limited to this configuration. As exemplified in FIG. 8, the seal member 50 may be configured as the closed ring-shaped member, and may be configured to include a release path 55 disposed in a portion of a lateral surface of this seal member 50. The release path 55 may be a hole extending through the seal member 50 (i.e., a hole extending from the inside of the seal member 50 to the outside thereof).

(5) The function of one of the plurality of components in each of the above embodiments may be shared by the plurality of components. Alternatively, the functions of the plurality of components may be exerted by one of the components. A part of the configuration in each of the above embodiments may not be provided. At least a part of the configuration in each of the above embodiments may be added to the configuration of the other embodiment or replaced with the configuration of the other embodiment. Various modifications may be made to each of the above embodiments within the scope of the disclosure.

What is claimed is:

1. A vehicle seat fan apparatus configured to be attached to a vehicle seat including a seat pad defining a support surface that supports a body of a seated occupant, the seat pad having an air passage configured such that air flows through the air passage, and the vehicle seat fan apparatus being configured to cause the air to flow through the air passage, the vehicle seat fan apparatus comprising:
   a fan including an impeller that generates airflow, and a fan opening as an opening that allows the airflow to move through the air passage, the fan being attached to the vehicle seat so as to extend along the seat pad at a position where an opening of the air passage provided on a back surface of the seat pad faces the fan opening;
   an attachment member that positions the fan such that the fan opening faces an opening in the air passage;
   a cover plate; and
   a seal member configured to be interposed between the opening of the air passage and the fan opening, and to surround a space between the opening of the air passage and the fan opening so as to form an airflow path that allows the airflow to move between the opening of the air passage and the fan opening, wherein
   a release path is provided in a connection portion where the seal member is connected to the opening of the air passage, so as to allow part of the airflow to move between an inside and an outside of the airflow path surrounded by the seal member, and between an inside and an outside of the air passage, and
   the seal member being spaced from the fan by the attachment member and by the cover plate.

2. The vehicle seat fan apparatus according to claim 1, wherein the release path is configured such that, when the fan is operated, a flow rate of the air flowing through the release path is lower than a flow rate of the air flowing through the air passage.

3. The vehicle seat fan apparatus according to claim 1, wherein a clearance is provided as the release path in a portion of the seal member, the clearance allowing the air to flow between the inside and the outside of the airflow path.

4. The vehicle seat fan apparatus according to claim 3, wherein in the seal member, the release path is provided at a position at which a load that is applied from the seated occupant is smaller than a load applied from the seated occupant at another position in the seal member.

5. The vehicle seat fan apparatus according to claim 3, wherein the seal member is configured as a ring-shaped member in which a portion is opened, and is configured such that the opened portion serves as the release path.

6. The vehicle seat fan apparatus according to claim 3, wherein the seal member is configured as a closed ring-shaped member, and a hole extending between an inside and an outside of a ring shape of the seal member is provided as the release path.

7. The vehicle seat fan apparatus according to claim 1, wherein the seal member comprises a softer material than a material constituting the seat pad.

8. The vehicle seat fan apparatus according to claim 1, the attachment member configured to support the fan such that the fan is pressed towards the back surface of the seat pad by an elastic force of the attachment member.

9. The vehicle seat fan apparatus according to claim 1, wherein the cover plate includes a plurality of protrusions that provide separation between the seat pad and the fan opening.

10. The vehicle seat fan apparatus according to claim 1, the seal member comprising an elastic foam material.

11. A vehicle seat comprising:
    a seat pad defining a support surface that supports a body of a seated occupant and having an air passage configured such that air flows through the air passage; and
    a fan apparatus configured to cause the air to flow through the air passage, wherein
    the fan apparatus includes:
        a fan including an impeller that generates airflow, and a fan opening as an opening that allows the airflow to move through the air passage, the fan being attached to the vehicle seat so as to extend along the seat pad at a position where an opening of the air passage provided on a back surface of the seat pad faces the fan opening;
    an attachment member that positions the fan such that the fan opening faces an opening in the air passage;
    a cover plate; and
    a seal member configured to be interposed between the opening of the air passage and the fan opening, and to surround a space between the opening of the air passage and the fan opening so as to form an airflow path that allows the airflow to move between the opening of the air passage and the fan opening, and
    a release path is provided in a connection portion where the seal member is connected to the opening of the air passage, so as to allow part of the airflow to move between an inside and an outside of the airflow path surrounded by the seal member, and between an inside and an outside of the air passage, and
    the seal member being spaced from the fan by the attachment member and by the cover plate.

12. The vehicle seat according to claim 11, wherein the release path is configured such that, when the fan is operated, a flow rate of the air flowing through the release path is lower than a flow rate of the air flowing through the air passage.

13. The vehicle seat according to claim 11, wherein a clearance is provided as the release path in a portion of the seal member, the clearance allowing the air to flow between the inside and the outside of the air flow path.

14. The vehicle seat according to claim 11, wherein in the seal member, the release path is provided at a position at which a load that is applied from the seated occupant is smaller than a load applied from the seated occupant at another portion of the seal member.

15. The vehicle seat according to claim 11, wherein the seal member comprises a ring-shaped member with a gap therein, and the gap comprises the release path.

16. The vehicle seat according to claim 11, wherein the seal member comprises a closed ring-shaped member, and an aperture extending between an inside and an outside of the seal member comprises the release path.

17. The vehicle seat according to claim 11, wherein the seal member comprises a material softer than a material constituting the seat pad.

18. The vehicle seat according to claim 11, the attachment member configured to support the fan such that the fan is pressed towards the back surface of the seat pad by an elastic force of the attachment member.

19. The vehicle seat according to claim 11, wherein the cover plate includes a plurality of protrusions that provide separation between the seat pad and the fan opening.

20. The vehicle seat according to claim 11, the seal member comprising an elastic foam material.

* * * * *